United States Patent Office 3,057,782
Patented Oct. 9, 1962

3,057,782
CROSS-LINKED GELATIN PLASMA SUBSTITUTE AND PRODUCTION THEREOF
Fritz Lindner, Hofheim (Taunus), and Josef Schmidt-Thomé, Frankfurt am Main, Germany, assignors to Farbwerke Hoechst Aktiengesellschaft vormals Meister Lucius & Brüning, Frankfurt am Main Hochst, Germany, a corporation of Germany
No Drawing. Filed Jan. 19, 1959, Ser. No. 787,342
Claims priority, application Germany Jan. 22, 1958
10 Claims. (Cl. 167—78)

The application of substitutes for blood plasma is still of greatest importance in all cases where human blood or plasma in preserved form is available to an unsufficient amount only, if any. Such a substitute must contain hydrophilic colloids whose molecules are of such a size that they remain in the blood circulation for at least 12 to 24 hours, and it must have almost the same colloid-osmotic pressure as that of the blood plasma; on the other hand, the substitute shall disappear from the circulation after a few days and be completely decomposed or excreted. It is also necessary that such a substitute be free from pyrogenic and antigenic properties and that it is well tolerated in every respect.

Numerous substances have been proposed as substitutes for blood plasma, for example, animal blood plasma, gum arabic, pectins, polysaccharides such as dextans or laevans, synthetic colloids such as polyvinyl pyrrolidone or polyvinyl alcohol. The destiny of these substances in the organism, their excretion or possible storage as well as their antigenic action is not yet cleared up, so that their application always involves some risks. It has been further proposed to use solutions of gelatine as substitute for blood plasma. Over many other substitutes gelatine has the advantage of being a protein which has almost no antigenic properties and can be decomposed by proteolytic enzymes or easily excreted by the organism, respectively. A disadvantage of gelatine is, however, that its solutions gel at room temperature so that they must be liquefied by heating before the injection, and that, due to their rapid excretion, they do not remain long enough in the system.

Various experiments have been carried out in order to improve the properties of gelatine. Hydrolytic degradation, for example, reduces the average molecular size so that the gelatine does no more gel at room temperature. Such degraded gelatine, however, is more rapidly excreted than untreated gelatine.

Furthermore, one has also "hardened" or cross-linked, respectively, gelatine by subjecting it to a treatment with aldehydes, for example, formaldehyde, glyoxal or similar condensation agents, and then degrading it partially by hydrolysis or by oxidation, in order to obtain from the first obtained high molecular product a product which has a lower molecular weight. The final products contain a larger amount of ionizable carboxylic groups than the starting gelatine, which causes that the isoelectric point is lowered and the solubility improved. Another improvement has been reached by subjecting the gelatine to the reaction with anhydrides or chlorides of certain polycarboxylic acids. The resulting product, in which the ratio of free amino groups to carboxylic groups is modified, shows increased solubility and possesses more favorable colloidosmotic properties.

Despite the above described improvements blood plasma substitutes hitherto prepared from gelatine did not satisfy the requirements especially with regard to the uniformity of their properties, and, in consequence thereof, they did not enter into general use.

Now we have found that an improved substitute for blood plasma can be obtained by (1) degrading collagen degradation products by means of mild hydrolysis to a molecular weight of 2,000–20,000, preferably 5,000–10,000, (2) cross-linking the hydrolysate obtained with a polyfunctional isocyanate, the quantity of isocyanate applied being smaller than the quantity calculated from the amount of amino and guanidino groups present in the hydrolysate and preferably amounting to 20–80% of the calculated quantity, and (3) adjusting the cross-linked solution to a pH value of about 7, and then (4) rendering it isotonic by addition of sodium chloride.

The material to be used as starting substance shall be free from pyrogenic and any other pharmacologically active ingredients; purest possible bone gelatine is the most suitable substance for this purpose. Undesirable inorganic ingredients, above all calcium salts, can be eliminated by dialysis, electrodialysis or, at best, by a treatment with an ion exchanger.

The degradation of the collagen degradation products or of the gelatine, respectively, can be carried out by acidic, alkaline or fermentative hydrolysis. The gelatine can be hydrolyzed in a particularly mild manner by heating to a temperature between 60 and 150° C., preferably to 120° C., in aqueous solution with almost neutral reaction for so long a period until the desired degree of hydrolysation is reached at a molecular weight between 2,000 and 20,000. If a good bone gelatine is used, a period of heating to 120° C. of about 5–6 hours in a closed vessel suffices to degrade the molecules to a weight of 5,000 to 10,000. The gelatine or the finished blood plasma substitute is applied with a concentration of 4–6%, corresponding approximately to the concentration of protein in the blood; the hydrolytic degradation and the subsequent cross-linking can be carried out also with lower or with higher concentrated solutions.

The reaction of the hydrolysate with the polyfunctional isocyanates can be carried out immediately after hydrolysis and in the same solution. Under these conditions the isocyano groups react with the reactive amino groups or with the amide or guanidino groups, respectively, of the peptide chains in forming urea groups. Two or more polypeptide chains are thereby cross-linked over urea bridges to a larger molecule.

When a diisocyanate is used, for example, the reaction can be illustrated as follows:

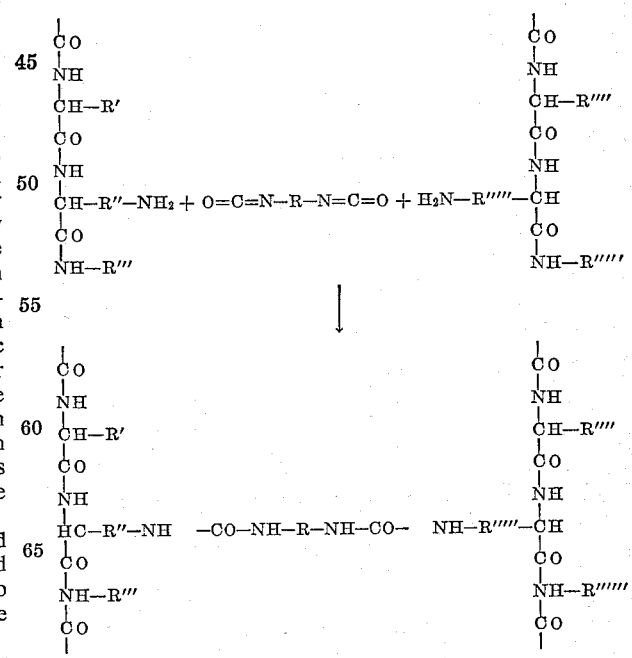

The cross-linking reaction is advantageously carried out in a neutral to weakly alkaline solution, because the reaction takes place only slowly, if any, in an acid solution. Since the basic amino groups are converted during the reaction into very weakly basic urea groupings while carboxylic groups previously present in the form of internal salts, are liberated, the pH-value is reduced. It is, therefore, necessary to readjust the pH-value by continuously adding, in dependence on the consumption of isocyanate, a dilute alkali hydroxide solution and to maintain the pH-value between 7 and 8.

The isocyanate is added, advantageously while vigorously stirring the solution, either directly as such or dissolved in an organic solvent which is miscible with water but inert to isocyanate, as, for example, tetrahydrofurane or acetone. The temperature of the solution may vary within wide limits, for example between 0° and 100° C., the most advantageous temperature being 30° C. The addition of the isocyanate is carried out most advantageously in portions, and the course of the reaction can be observed at the change of the pH-value or at the aforesaid consumption of alkali. As isocyanates enter into consideration: aliphatic poly-isocyanates, particularly those of the type $OCN—(CH_2)_x—NCO$, wherein $x$ represents a whole number in the range of 2 to 20, or also aromatic or hydroaromatic polyisocyanates.

Which quantity of isocyanate is the most advantageous for the cross-linking depends on the size of the molecules of the hydrolysate and on the quality of the starting material used; it may be a value of between 10 and 100% of the quantity ascertained by $NH_2$ analysis. Especially suitable products are obtained from a hydrolysate having molecular weights of 5,000 to 10,000 if about 30–40% of the quantity of a polyfunctional isocyanate, which quantity was calculated from the content of amino or guanidino groups according to the amino acid composition of the gelatine or from the degree of hydrolyzation, respectively, are applied. After the cross-linking operation any organic solvent used for dissolving the isocyanate must be eliminated from the final product. This is preferably realized by distillation in vacuo while adding, in order to prevent foaming, an antifoaming agent, for example, octylalcohol which passes over with the water vapor during distillation.

For practical use the solution is made up to such a volume that it contains 5% of protein. There is then added such a quantity of sodium chloride or physiologic mixture of salt as is necessary to make the solution isotonic. The solution is subsequently sterilized and filled into ampoules. Sterilization can be carried out by filtration or by heating to 120° C. for 10–20 minutes.

By lyophylization there can also be prepared a dry powder which is dissolved in sterile water before application.

The products obtained according to the described method of preparation are excellent plasma substitutes which are distinguished from the known substitutes by a great many advantages. Solutions of these products are completely clear and, in contrast to other substitutes, also completely colorless; the coagulation point is below 10° C. The molecular weight of the products is in the range of 15,000 and 60,000; it is possible, however, to adapt it to the requirements of practice by varying the conditions of preparation. The most suitable products proved to be those having a molecular weight of about 20,000. Measurements in the ultra-centrifuge show that the molecules of the final products are essentially uniform in size.

Animal tests proved that the solutions are excellently tolerated and do not display any toxic effects. Particularly outstanding was the fact that a full plasma substitution effect was reached in blood exchange experiments and in surviving tests with products which had a molecular weight of about 20,000 only. Excretion tests revealed that half of the substance had disappeared from the blood only after 24 hours and that the further excretion was completed after 2 to 3 days. In contradistinction thereto, gelatine showed much more unfavorable excretion conditions and was no more detectable in the blood already after a few hours.

The cause of this very desirable, prolonged period of dwell of the cross-linked products in the blood is that they are most slowly split off by enzymes like trypsin, pepsin and tissue enzymes, than is gelatine. The increased resistance of the molecules to being split off caused by the cross-linkage, also contributes to a slower excretion. Deposition of these products in the system, however, could not be determined in animal tests.

The prolonged heating during the degradation destroys with certainty any small amounts of antigens which might be present in the starting material. Extended anaphylactic tests proved this and corroborated the complete absence of antigenic properties.

In accordance with the another embodiment of the invention, similar products are obtained when collagen degradation products, preferably gelatine, are first cross-linked with a polyfunctional isocyanate, the quantity of isocyanate applied amounting to about 20–80% of the quantity calculated from the amount of amino and guanidino groups present, the cross-linked product that has formed is then degraded by mild hydrolysis to a molecular weight of 10,000–100,000, preferably 30,000–60,000, the solution obtained is adjusted to a pH value of about 7 and then made isotonic by addition of sodium chloride.

Both methods of preparation produce the same cross-linking effect. The blocking of the amino or guanidino groups of the final products, produced by the urea bridges introduced with the aid of the isocyanate, causes the ratio of free carboxylic groups to amino groups to shift in favour of the first ones. This implies that the solubility rises and the gelatinizability decreases. The urea bridges between the various molecules, newly formed by the cross-linkage, are not split off under the mild conditions of hydrolysis; splitting occurs only between the peptide linkages of the protein chains.

Since during the cross-linking reaction the viscosity rises and the solution gels after some time, it is no longer suitable to further add isocyanate at this stage and to readjust the pH value after gelatination. By allowing the cross-linked solution to stand for several hours after gelatinization, a complete reaction of the isocyanate with the starting material to be cross-linked is also reached in this case.

The isocyanate can be added either directly or dissolved in a suitable solvent while vigorously stirring. The degradation of the cross-linked products is effectuated in the same manner as in the first described embodiment. When it is carried out in the thermic way, a period of heating to 120° C. of about 5–6 hours in a closed vessel gives the best results.

The following examples illustrate the invention:

*Example 1*

1 liter of an aqueous solution of 5% strength of bone gelatine, prepared from 60 grams of a gelatine having 15.12% of moisture and 1.68% of ash, is adjusted to a pH-value of 6.9 and heated in a closed vessel placed in a vapor autoclave to 120° C. for 5½ hours. After cooling to about 90° C. the vessel is removed from the autoclave and allowed to cool to room temperature. The solution is filtered and 9 grams of pure sodium chloride are added and after having adjusted the pH-value to about 7, a solution of 1.6 cc. of hexamethylene-diisocyanate in 25 cc. of tetrahydrofurane is run into the solution at a temperature of about 30° C. while stirring vigorously. The pH-value of the solution is continuously observed and maintained at about 7 by addition of dilute sodium hydroxide solution. After 3 hours the reaction is completed. For eliminating the tetrahydrofurane, the solution is concentrated in vacuo to about half the quantity, some drops of octylalcohol having been added in order to prevent foaming; the octylalcohol added passes over during the distillation. The solution is then made up to 1 liter by means of water and, if necessary, again filtered. The solution is filled into bottles or ampoules and then sterilized by heating to 120° C. for 20 minutes. The sodium chloride, necessary for making the solution isotonic, can be added either at the beginning of the process, i.e. before the degradation of the gelatine, or at the end of the process, i.e. before sterilization. Instead of tetrahydrofurane, acetone can also be used for the dissolution of hexamethylene-diisocyanate.

*Example 2*

1 liter of a gelatine solution of 5% strength is degraded by heating to 120° C. in the manner described in Example 1. A suspension of 1.66 cc. of hexamethylene-diisocyanate in 30 cc. of water is added and the cross-linking reaction is allowed to proceed at 30° C. while stirring vigorously; the pH-value is maintained at about 7 by continuously adding dilute sodium hydroxide solution. When the pH does no more change, the reaction is completed. If necessary, the solution is then filtered, 9 grams of pure sodium chloride are added, and the solution is then filled into ampoules or bottles and sterilized by heating to 120° C. for 20 minutes.

*Example 3*

2 liters of an aqueous solution of 5% strength of bone gelatine are adjusted to a pH value of 7. Into this solution are added at 30° C., while stirring vigorously, 3.32 cc. of hexamethylene-diisocyanate dissolved in 25 cc. of tetrahydrofurane. During the cross-linking reaction now proceeding the viscosity gradually rises until the solution gelatinizes; this occurs after about ½ hour. Stirring is then interrupted and the solution is allowed to stand for 15 minutes. The gelatine is then heated in a closed vessel to 120° C. for 5½ hours. To the solution, which has become liquid again, there are added 18 grams of sodium chloride and the solution is concentrated in vacuo to two-thirds of the initial volume. In order to prevent foaming, there may be added octylalcohol which passes over during the distillation. The solution is then made up to its original volume by means of water, the pH value is adjusted, if necessary, to about 7, and the solution is filled into ampoules or into bottles. It is then sterilized by heating to 120° C. for 20 minutes.

If acetone is used as solvent for the diisocyanate instead of tetrahydrofurane, the cross-linking reaction can be realized in the same manner, and the further process is carried out as described above.

*Example 4*

To 200 cc. of a gelatine solution of 5% strength, having a pH value of 7.15, there are added at 30° C., while stirring vigorously, 0.32 cc. of hexamethylene-diisocyanate suspended in 10 cc. of water and emulsified by centrifuging. After having been stirred for 20 minutes, the gelatine that has formed is allowed to stand for some hours at room temperature without stirring. The degradation is then carried out in a closed vessel by heating to 120° for 5½ hours, and 0.9 g. of sodium chloride is added to the solution which has become liquid again.

After filtration and, if necessary, after adjustment of the pH value to about 7, the solution is filled into bottles and sterilized by heating to 120° C. for 20 minutes.

We claim:

1. A process for the manufacture of a substitute for blood plasma wherein gelatine product is cross-linked, at a temperature between about 0 and 100° C., with a polyfunctional isocyanate, the quantity of isocyanate applied amounting to 20–80% of the quantity calculated from the amount of amino and guanidino groups present, the thus obtained cross-linked polymer is subjected to mild hydrolytical degradation to a molecular weight of 10,000–100,000, preferably 30,000–60,000, annd the solution obtained is made isotonic by addition of sodium chloride and sterilized by heating to 120° C.

2. A process for the manufacture of a substitute for blood plasma as claimed in claim 1, wherein an aqueous gelatine solution of 5% strength is cross-linked with hexamethylene-diisocyanate at 20–30° C., subsequently hydrolyzed under pressure at 120° C. until a molecular weight of 10,000–100,000 is reached.

3. A process for the manufacture of a blood plasma substitute which comprises subjecting gelatine to hydrolytic degradation and to cross-linking with a difunctional isocyanate to form a modified gelatin solution containing cross-linking urea groups and having a molecular weight in the range of about 10,000 to 60,000, the degradation being carried out at a temperature between about 60 and 150° C. and the cross-linking being carried out at a temperature between about 0 and 100° C., and adding sodium chloride to the modified gelatin solution to make it isotonic.

4. A process for the manufacture of a substitute for blood plasma as claimed in claim 3, wherein during the cross-linking reaction the reaction solution is maintained at a pH value of about 7 by continuous addition of dilute sodium hydroxide solution.

5. A process for the manufacture of a substitute for blood plasma as claimed in claim 3, wherein tetrahydrofurane is used as solvent for hexamethylene-diisocyanate.

6. A process for the manufacture of a substitute for blood plasma as claimed in claim 3, wherein acetone is used as solvent for hexamethylene-diisocyanate.

7. A process for the manufacture of a substitute for blood plasma as claimed in claim 3, wherein an aqueous suspension of hexamethylene-diisocyanate is used.

8. A process for the manufacture of a substitute for blood plasma wherein gelatine is subjected to mild hydrolytical degradation to a molecular weight of 2,000 to 20,000, the hydrolysate is cross-linked with a difunctional isocyanate at a temperature of about 20 to 30° C. while maintaining a pH value of about 7, the quantity of isocyanate applied amounting to 20–80% of the quantity calculated from the amount of amino and guanidino groups present in the hydrolysate, and the solution obtained is made isotonic by addition of sodium chloride and sterilized by heating to 120° C.

9. A process for the manufacture of a substitute for blood plasma as claimed in claim 8, wherein an aqueous gelatine solution of 5% strength is hydrolyzed under pressure at 120° C. until a molecular weight of 5,000–10,000 is reached and the hydrolysate is cross-linked with hexamethylene-diisocyanate at 20–30° C.

10. A blood plasma substitute comprising an isotonic, sterilized solution of modified gelatin containing cross-linking urea-alkylene-urea groups and having a molecular weight in the range of about 10,000 to 60,000.

References Cited in the file of this patent

UNITED STATES PATENTS

| | | |
|---|---|---|
| 2,374,136 | Rothrock | Apr. 17, 1945 |
| 2,460,980 | Fraenkel-Conrat | Feb. 8, 1949 |
| 2,591,133 | Campbell | Apr. 1, 1952 |
| 2,719,146 | Schwander | Sept. 27, 1955 |
| 2,816,099 | Young | Dec. 10, 1957 |
| 2,827,419 | Tourtellotte | Mar. 18, 1958 |
| 2,880,054 | Moore | Mar. 31, 1959 |

FOREIGN PATENTS

| | | |
|---|---|---|
| 726,354 | Great Britain | Sept. 7, 1955 |

OTHER REFERENCES

Wenner: Annals Otology, Rhinology & Laryngology, vol. 53, 1944, pp. 635–643.

Barr et al.: J. Soc. Dyers & Colorist, November 1946, p. 338.